Patented Jan. 9, 1923.

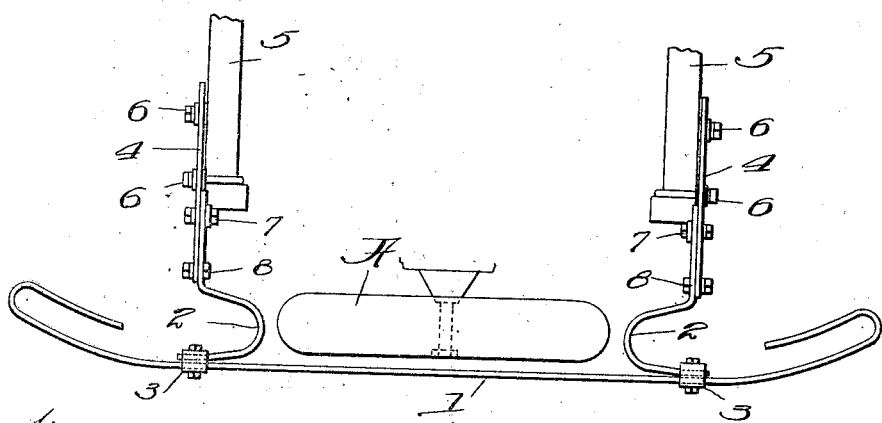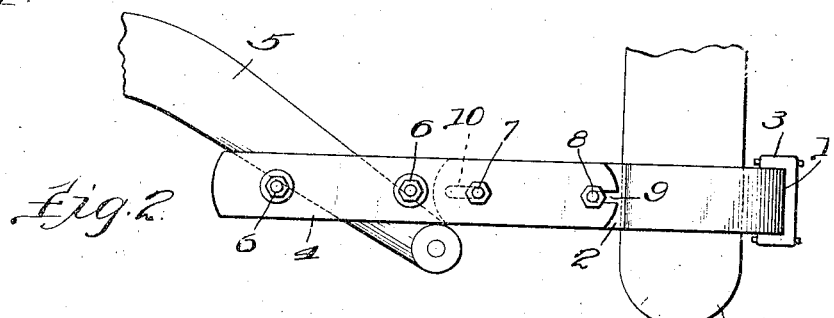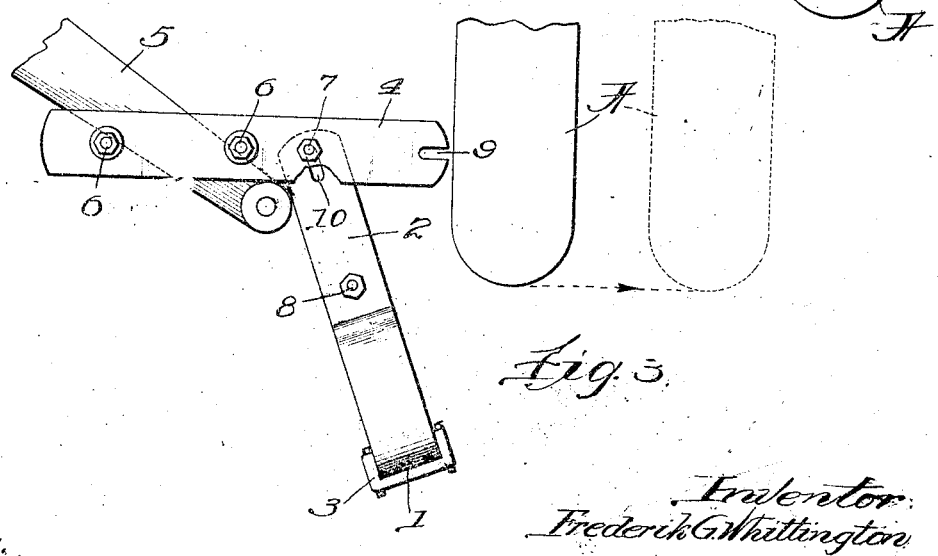

1,441,254

UNITED STATES PATENT OFFICE.

FREDERIK G. WHITTINGTON, OF EVANSTON, ILLINOIS, ASSIGNOR TO STEWART-WARNER SPEEDOMETER CORPORATION, OF CHICAGO, ILLINOIS, A CORPORATION OF VIRGINIA.

ADJUSTABLE BUMPER.

Application filed March 6, 1922. Serial No. 541,276.

*To all whom it may concern:*

Be it known that I, FREDERIK G. WHITTINGTON, a citizen of the United States, residing in Evanston, in the county of Cook and State of Illinois, have invented certain new and useful Improvements in Adjustable Bumpers, of which the following is a specification, reference being had to the accompanying drawings, forming a part thereof.

This invention relates to supporting means for automobile bumpers and its purpose is to provide for readily moving the transverse impact bar out of its normal position when desired, as for example, when the bumper is mounted at the rear of an automobile and would otherwise prevent or embarrass removal of a spare wheel or tire carried between the body and the impact bar. The invention consists of certain details of construction and their combination hereinafter described and shown in the drawing, as indicated by the claims.

In the drawings:—

Figure 1 is a top plan view of a bumper constructed in accordance with this invention shown in position of use.

Figure 2 is a side elevation of the parts shown in Figure 1.

Figure 3 is a side elevation showing the bumper swung about its pivotal mounting to avoid obstructing the spare wheel or tire.

As illustrated, the bumper comprises an impact bar, 1, of flat spring metal with reflexed supporting arms, 2, which are secured to the impact bar, 1, by means of clamped clips, 3. The arms, 2, are themselves carried by flat supporting arms, 4, attached to the rear end portions of the vehicle side frame members 5, by any convenient means such as hook bolts, 6. The supporting arms, 2, are pivotally connected to the arms, 4, by pivot bolts, 7, fixed in the said supporting arms, 4; but pivotal action about the bolts, 7, is normally prevented by the presence of locking bolts, 8, fixed in the arms, 2, and engaging open ended slots, 9, in the respective arms, 4. For the pivots, 7, the inner ends of the arms, 2, are slotted at 10, so that upon loosening the nuts of the bolts, 7 and 8, the arms, 2, may be slid upon the arms, 4, to the extent of the slots, 10, so as to free the locking bolts, 8, from the open ended slots, 9, and permit the arms, 2, and the impact bar, 1, to be swung down about the pivots, 7, as shown in Figure 3. Thus if a spare wheel or tire is supported at the rear of the vehicle in the position indicated at A, so that it must be withdrawn transversely of the normal position of the impact bar, 1, this pivotal movement of the bar will carry it clear of the path of such withdrawal of the wheel or tire; and the bumper may be quickly re-adjusted by merely swinging it back, sliding the bolts, 8, into the slots, 9, and again tightening the nuts on bolts, 7 and 8.

I claim:—

1. In combination with a vehicle frame, a bumper comprising an impact bar and a pair of two-part supporting arms, one part of each arm being rigidly attached to the frame and the other being fixed to the impact bar, the two parts being lapped upon each other with a pivot and a bolt connecting them, said pivot and bolt each engaging a longitudinal slot in one part and one of said slots being formed as a notch at the end of the part opening endwise thereof to permit disengaging the bolt from the slot by sliding one part upon the other.

2. In the combination defined in claim 1, the other slot being formed in the other part and closed at both ends to prevent complete detachment of the parts when the bolt is disengaged from the notch.

3. In the combination defined in claim 1, said pivot being also a bolt for clamping the parts firmly together.

4. In the combination defined in claim 1, said two parts of each supporting arm being formed of flat stock set vertically on edge and lapped face to face in substantial alignment when the bolt engages the notch.

5. In combination with a vehicle frame, a bumper comprising an impact bar and a pair of two-part supporting arms, one part of each arm being rigidly attached to the frame and the other being fixed to the impact bar, the two parts being lapped upon each other with a pivot and a bolt connecting them, said pivot and bolt each engaging a longitudinal slot in one part and one of said slots being formed as a notch opening through the edge of the part to permit disengaging the bolt from said notch and swinging the part about the pivot.

6. In combination with a vehicle frame, a bumper comprising an impact bar and a pair of two-part supporting arms, one part of each arm being rigidly attached to the frame and the other being fixed to the impact bar, the two parts being lapped upon each other with a pair of fasteners connecting them, said fasteners each engaging a longitudinal slot in one part and one of the slots being formed as a notch opening through the end of the part to permit disengaging the fastener therefrom and swinging the part about the other fastener as a pivot.

7. In the combination defined in claim 6, the fastener which engages the notch being a clamping bolt for securing the parts firmly together.

8. In the combination defined in claim 6, the fastener which serves as a pivot being a clamping bolt for holding the parts securely when the other fastener engages the notch.

In testimony whereof, I have hereunto set my hand this 28th day of February, 1922.

FREDERIK G. WHITTINGTON.